Sept. 8, 1959  J. A. RAVE, JR., ET AL  2,902,904
CONTROL SYSTEM FOR MACHINE TOOLS
Filed April 1, 1957  2 Sheets-Sheet 1
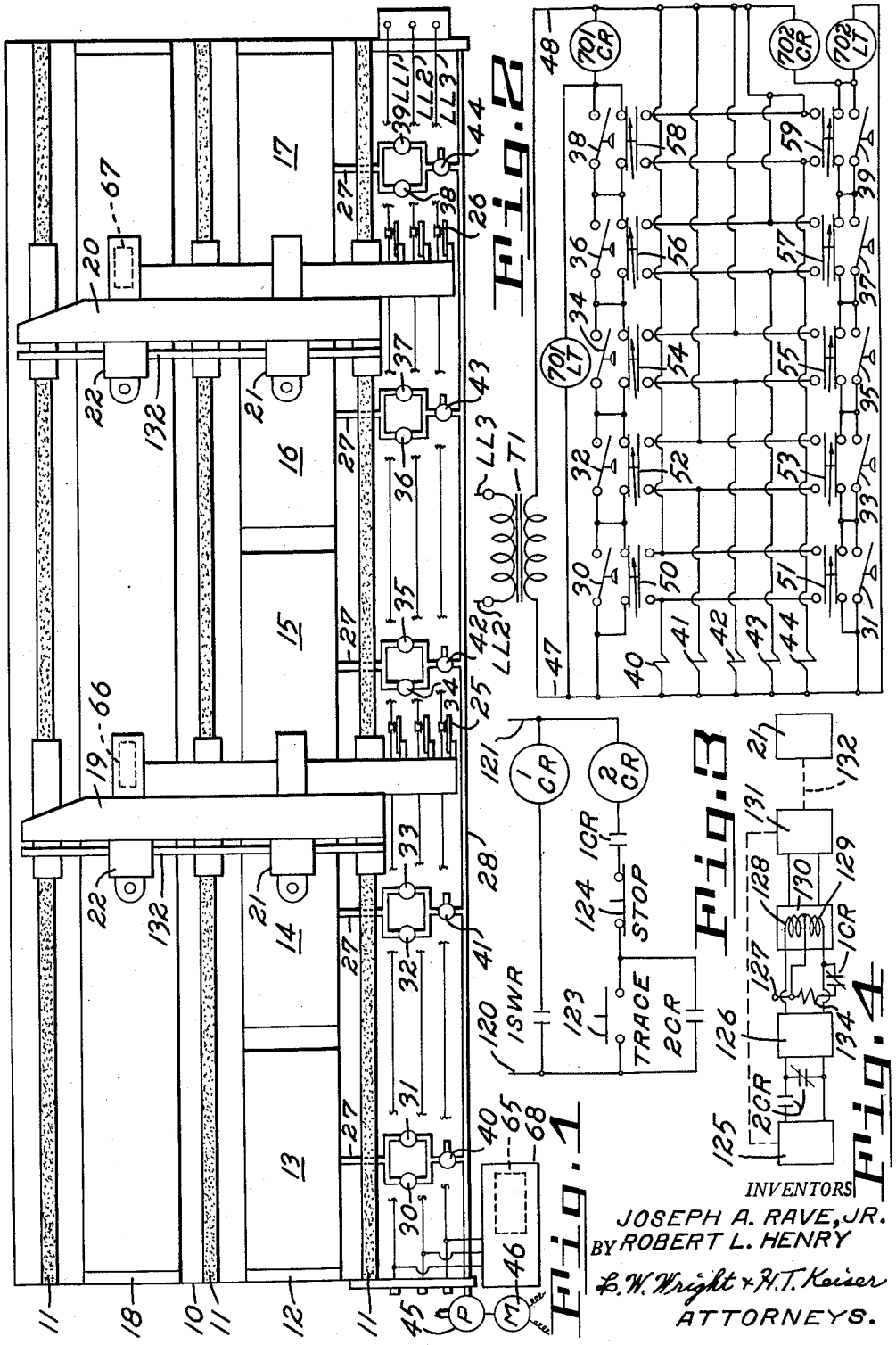
INVENTORS
JOSEPH A. RAVE, JR.
BY ROBERT L. HENRY
L. W. Wright & H. T. Keiser
ATTORNEYS.

INVENTORS.
JOSEPH A. RAVE, JR.
ROBERT L. HENRY.
BY
ATTORNEYS.

United States Patent Office 2,902,904
Patented Sept. 8, 1959

2,902,904

CONTROL SYSTEM FOR MACHINE TOOLS

Joseph A. Rave, Jr., and Robert L. Henry, Cincinnati, Ohio, assignors to The Cincinnati Milling Machine Co., Cincinnati, Ohio, a corporation of Ohio Application April 1, 1957, Serial No. 649,803

10 Claims. (Cl. 90—13)

This invention relates to machine tools of the traveling carriage type in which electric energy is supplied by a trolley system to power operated devices on the moving carriage. In the system of the present invention control signals are transmitted to the carriage over the same trolley system, thereby eliminating a multiplicity of wires extending from the bed of the machine to the traveling carriage. In one form thereof, the invention is directed to a carrier current system for delivering to the traveling carriage of a machine tool, information concerning the bed conditions of the machine tool. The system is automatically responsive to the bed conditions so as to cause the power operated equipment on the carriage immediately to be disabled in the event that the bed conditions at any time become unsafe for continued operation of the machine tool. In the present system, a plurality of individual control signals may be transmitted to the carriage over the wires of the trolley system either by the use of signals of different frequencies, or by the use of a timed pulse type of multiplexing system, or by the use of both types of signals simultaneously to thereby increase the number of signals which may be thus transmitted to the carriage.

Accordingly, it is an object of the present invention to provide a remote control signaling system for machine tools.

Another object of the invention is to provide, in a machine tool employing a traveling carriage and trolleys for supplying energizing current to power operated means on the carriage, a carrier current system for transmitting signals to the carriage for controlling the power operated means in a desired manner.

Another object of the invention is to provide, in a machine tool of the carriage and trolley type, a carrier current system for disabling the power operated means on the carriage whenever the bed conditions of the machine tool become unsafe for continued operation of the tool.

Another object of the invention is to provide a carrier current signaling system for machine tools in which a timed pulse type of multiplexing system is utilized for enabling a plurality of signals to be transmitted over the wires of the trolley system to the power operated equipment on the moving carriage.

The novel features which are believed to be characteristic of the invention, both as to its organization and method of operation, together with further objects and advantages thereof, will be better understood from the following description considered in connection with the accompanying drawings in which a preferred embodiment of the invention is illustrated, by way of example. It is to be clearly understood, however, that the drawings are for the purpose of illustration and exemplification only and are not intended as a definition of the limits of the invention.

In the drawings:

Fig. 1 is a schematic plan view of a traveling carriage type of machine tool to which the invention has been shown applied.

Fig. 2 is a wiring diagram of the control equipment associated with the bed of the machine.

Fig. 3 is a wiring diagram of the control relays located on the carriages.

Fig. 4 is a block diagram of the tracer controlled servo-mechanism mounted on the carriages.

Figure 5:
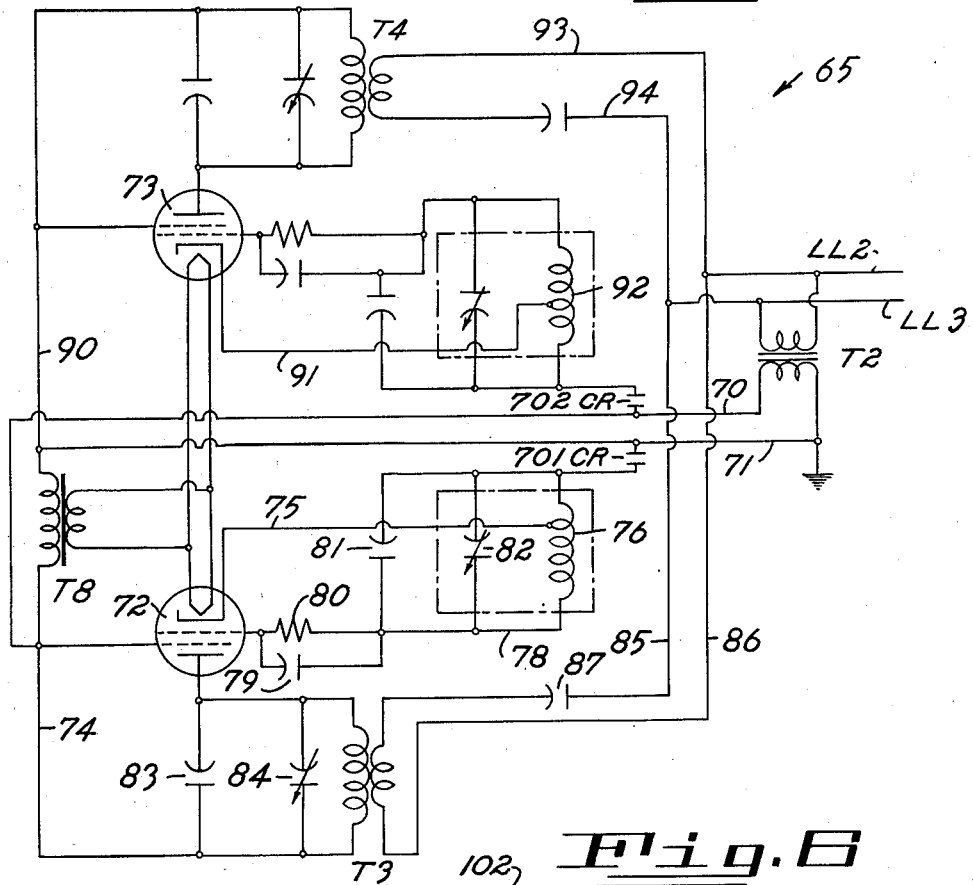
Fig. 5 is a wiring diagram of the transmitter for the carrier current system.

In the accompanying drawings, the invention is shown applied to a particular type machine tool structure which, however, is not the only type of organization to which the novel features of the invention may be applied. For example, in the present disclosure, the system is utilized to control the operation of two cutter heads mounted on separate carriages. It will be readily apparent, however, that the same system may be applied to a plurality of cutter heads mounted on the same carriage. In a like manner, the timed pulse type of multiplexing system has been shown as applied to only one phase of a three phase power supply whereby two signals are transmitted to the receivers on the carriages. It will be evident that the system could, if desired, be extended to the two remaining phases of the power supply to provide a total of six control signals rather than two. Also, signals of different frequencies might be used to still further increase the number of control signals which might be transmitted over the system. Other variations coming within the scope of the invention will doubtless become apparent to those skilled in the art as the description proceeds.

In Fig. 1 of the drawings the invention is shown applied to a machine tool having a bed 10 on which are provided three longitudinally extending ways 11. Also provided on the bed 10 is a longitudinally extending work support 12 provided with a plurality of tandem arranged vacuum chucks 13, 14, 15, 16, and 17. These chucks are of conventional design and may correspond to any of the commercially available vacuum type work holding fixtures of suitable size and character. The bed of the machine tool is also provided with a pattern support 18 extending longitudinally thereof on which the patterns for controlling the depth or contours cut by the tools in the work piece may be suitably mounted.

Traveling along the ways 11 are two gantries or carriages 19 and 20, each provided with a tool head 21, in which is mounted a power driven cutter, and a tracer head 22 for supporting the stylus which traces the outline of the pattern to be followed. The tracer may, for example, be arranged for depth tracing of a pattern (not shown) mounted on the support 18 and may be suitably linked to the tool head to cause the cutter mounted thereon to follow the vertical outline of the pattern. The power driven cutter will thereby machine the work held by the chucks 13–17, inclusive, to conform to the outline of the pattern.

The carriages 19 and 20 may be propelled along the ways 11 by drive motors mounted on the carriages and supplied with power from a three-phase source by power lines LL1, LL2, and LL3 supported on the bed of the machine and suitably connected to a source of three-phase current. Trolleys 25 and 26 supported on the carriages 19 and 20, respectively, cooperate with the power lines and deliver the current collected therefrom to the power operated equipment on the carriages. Such equipment may include the driving motors for the carriages, the spindle motors for driving the cutters, the tracer mechanism, etc. Each carriage is preferably provided with a platform and a control panel so as to enable the operator to ride with the carriage and control the equipment mounted thereon as the carriage moves along the bed of the machine.

As shown in Fig. 1, each vacuum chuck is provided with a vacuum line 27 which is connected to a vacuum header 28 through a pair of vacuum switches and a solenoid valve. In this view the vacuum switches are numbered 30–39, inclusive, while the valves and their associated solenoids are numbered 40–44, inclusive. Vacuum is maintained in the header 28 by means of a vacuum pump 45 driven by an electric motor 46.

The vacuum switches and solenoid valves are connected in a control circuit as shown in Fig. 2. As herein illustrated, a transformer T1 has its primary winding connected to the power lines LL2 and LL3 while the secondary winding is connected to conductors 47 and 48 across which the vacuum switches 30, 32, 34, 36, and 38 are connected in series with the operating coil of a relay 701CR. In a similar fashion, the vacuum switches 31, 33, 35, 37, and 39 are connected in series with a relay 702CR across lines 47 and 48. Each vacuum switch has connected in parallel therewith one pair of poles of a double pole, double throw switch for a purpose hereinafter to be described. In Fig. 2, these switches, which are manually operated, are numbered 50–59 inclusive. The second pair of poles of each of the switches 50–59 inclusive are connected together in pairs and are, in turn, connected in series with one of the solenoids 40–44 inclusive, across the lines 47 and 48. Hence, when the vacuum switches are shorted by the manually operated switches as shown in Fig. 2, the solenoids are deenergized and the chucks are cut off from the source of vacuum. However, when all of the switches of a string are operated to connect the second pair of poles thereof, the solenoids will be energized, thereby supplying vacuum to the chucks and closing the normally open vacuum switches provided the work to be machined is properly mounted on the chucks. Under these circumstances, the relays 701CR and 702CR will be energized and the signal lights 701LT and 702LT will be extinguished. When thus energized, the relays 701CR and 702CR cause a carrier current transmitter 65 (Fig. 1) located in a console 68 adjacent the bed of the machine to be rendered operative to transmit carrier current signals to receivers 66 and 67 (Fig. 1) located in control cabinets on the carriages 19 and 20 respectively.

As shown in Fig. 5, the transmitter 65 is provided with energizing current by a transformer T2 which has its primary winding connected to the power lines LL2 and LL3 and its secondary winding connected to conductors 70 and 71. As shown, the conductor 71 is connected to ground and also to one end of the primary winding of a filament transformer T8, the other end of which winding is connected to the conductor 70. The secondary winding of transformer T8 is connected to the filaments of vacuum tubes 72 and 73. The plate of tube 72 is connected to the conductor 70 through the primary winding of a radio frequency transformer T3 and a connecting lead 74. The cathode of the tube is connected by a line 75 with a tap on an oscillator coil 76 which has its grounded end connected to the conductor 71 through the normally open contacts of relay 701CR. The opposite end of the coil 76 is connected by a line 78 to the grid of tube 72 through a condenser 79 and a parallel connected resistor 80. A fixed condenser 81 and a variable condenser 82 connected in parallel across the coil 76 establish the operating frequency of the circuit while a fixed condenser 83 and a variable condenser 84 connected in parallel across the primary winding of transformer T3 serve to tune the plate circuit of the tube 72 to the same frequency. There is thereby provided a Hartley type of oscillator in which bias on the grid of the tube 72 is provided by grid current which charges the capacitor 79 through the resistor 80 during the portion of the R-F cycle when the grid is positive with respect to the cathode. The condenser 79 discharges during those portions of the cycle when the grid is negative with respect to the cathode.

The tube 73 is connected in a similar oscillator circuit which will be described only insofar as it differs from the circuit for the tube 72. As shown in Fig. 5, the plate of tube 73 is connected to the ground conductor 71 through a line 90 and the primary winding of a radio frequency transformer T4. The cathode of this tube is connected through a line 91 with a tap on an oscillator coil 92, the lower end of which is connected through the normally open contacts of relay 702CR to the conductor 70. Hence, the tube 73 will operate 180 degrees out of phase with the tube 72 and will provide an R-F signal on alternate half cycles of the current supplied to the tube by the power lines LL2 and LL3. During each half cycle that the tube 73 is nonconducting, the tube 72 will conduct and transmit an R-F signal of a frequency determined by the tuned circuits of the oscillator. The frequencies of the signals produced by tubes 72 and 73 may, for the purposes of the apparatus herein disclosed, either be the same, or they may be sufficiently different to permit selective tuning of the receivers 66 and 67 on the carriages to receive one or the other of the signals. Since, in the present embodiment of the invention, only two signals are required, the use of alternate phases may be relied upon to provide two separate signals though two different frequencies might also be employed in addition thereto.

The R-F oscillations produced in the plate circuit of tube 72 are inductively coupled to the power lines LL2 and LL3 by the secondary winding of transformer T3 which is connected by lines 85 and 86 with the power lines. A condenser 87 is inserted in the line 85, the value of which is chosen to provide a high rejection ratio between the carrier current frequency and the line frequency. In a like manner, the secondary winding of transformer T4 is connected by lines 93 and 94 to the lines LL2 and LL3 to couple the output from tube 73 thereto. In this manner, two carrier current signals are alternately applied to the power lines LL2 and LL3 at a frequency corresponding to that of the current supplied by the power lines. The signals are controlled by the relays 701CR and 702CR and will be transmitted only when the appropriate relay is energized to close its contacts shown in Fig. 5.

Figure 6:
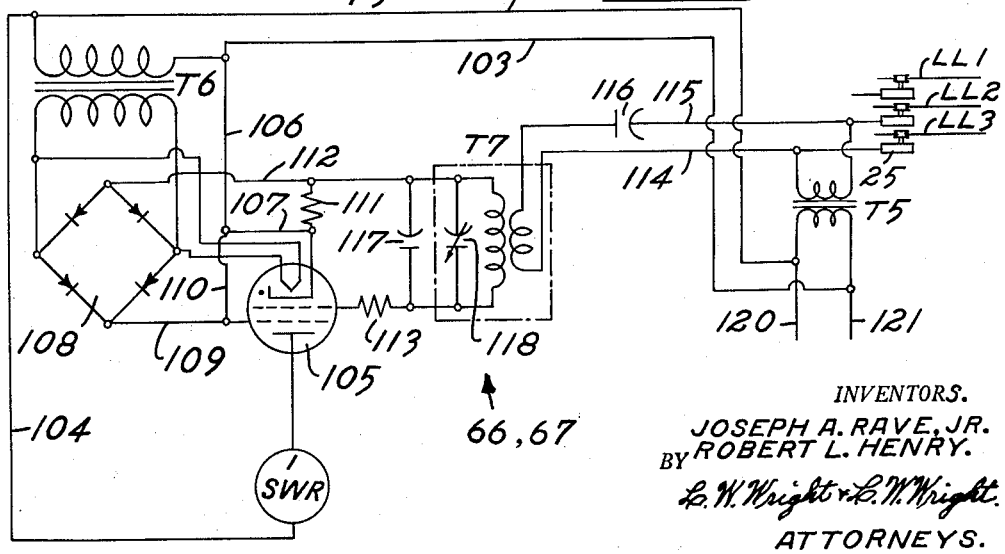
Fig. 6 is a wiring diagram of one of the receivers of the carrier current system.

The carrier current signals thus provided are transmitted along the power lines LL2 and LL3 to the trolleys 25 and 26 on the carriages 19 and 20 where they are picked up and used to control the operation of relays incorporated in the receivers 66 and 67. The receivers 66 and 67 are of similar construction, and the wiring diagram for each is shown in Fig. 6 of the drawings. As there shown, power for operating each receiver is derived from the power lines LL2 and LL3 which energizes the primary winding of a transformer T5. The secondary winding of this transformer is connected by lines 102 and 103 to the primary winding of a filament transformer T6. The secondary winding of this transformer is connected to the filament leads of a Thyratron tube 105, the plate of which is connected to the line 102 through the operating coil of a relay 1SWR and a line 104. The cathode of the tube is connected to the line 103 through lines 106 and 107. The cathode is biased positive with respect to the grid of the tube by means of a full wave bridge type rectifier 108 which is fed from the secondary winding of the transformer T6 and causes D.C. current to flow through lines 109, 110, 107, cathode resistor 111 and back to the bridge through a line 112. The direction of current flow through the resistor 111 is such as to render the cathode positive with respect to the line 112. The grid of the tube is connected to the line 112 through the secondary winding of a radio frequency transformer T7 and a current limiting resistor 113. The grid is thereby biased negative with respect to the cathode and the tube will not fire in the absence of a signal of sufficient amplitude to raise the grid to the firing point.

The signals impressed on the power lines LL2 and LL3 are conveyed to the receiver by lines 114 and 115 which are connected to the primary winding of transformer T7. A condenser 116 of suitable value is inserted in the line 115 to provide a high rejection ratio between the carrier current frequency and the line frequency. When a signal arrives at the receiver which is in phase with the positive swing of the plate of tube 105, the positive peaks of the signal will overcome the bias on the tube and cause it to fire, thereby energizing the relay 1SWR. The plate of tube 105 will operate in phase with either tube 72 or 73 of the transmitter, depending on the connection of the lines 102 and 103 to the terminals of the secondary winding of transformer T5. This is so since both the tubes 72, 73 and the tube 105 are operated from the same two power lines LL2 and LL3. The grid circuit of the tube 105 may also be tuned to a frequency corresponding to that of the transmitter tube with which it cooperates. This may be done by means of a fixed condenser 117 and a variable condenser 118 connected in parallel across the secondary winding of the transformer T7. If four signals were required in place of two, two different frequencies, in addition to the alternate phasing of the transmitter tubes, could be utilized to provide the necessary number of signals. In any system, there will be required, of course, as many transmitter tubes as there are signals required for effecting control. In addition, there must also be provided one receiving tube, corresponding to tube 105, for each signal utilized.

The control circuit in which the relay 1SWR is utilized is shown in Fig. 3 of the drawings. As therein shown, energizing current is supplied to the conductors 120 and 121 from the secondary winding of transformer T5 to which the conductors are connected as shown in Fig. 6. Connected across these two conductors are the normally open contacts of relay 1SWR, and the operating coil of a relay 1CR. Also connected in series relation across the conductors 120 and 121 is a push button switch 123 for initiating a tracing operation, a stop switch 124 for stopping a tracing operation, the normally opened contacts of the relay 1CR, and the operating coil of a relay 2CR. The latter relay has a pair of normally open contacts connected across the push button switch 123 so as to lock in the relay across this switch after the push button has been released. It will be noted from the foregoing circuit that when a carrier current control signal is passed by the receiver with which the relay 1SWR is associated, a tracing operation may be initiated by depression of push button 123, the normally open contacts 1CR being closed due to energization of relay 1CR by the closed contacts of 1SWR. Thereby, the relay 2CR will be energized and locked in across the push button 123 so that it will remain energized so long as relay 1SWR is energized or until the push button 124 is depressed to stop the operation.

The manner in which this control circuit may be utilized to disable the machine tool in the absence of a control signal is illustrated by the block diagram shown in Fig. 4. In this diagram, the block 125 represents the tracer unit contained in the tracing head 22, which unit provides an electric error signal whenever the stylus thereof is either overdeflected or underdeflected. This signal is transmitted through the normally open contacts of relay 2CR to a phase detector and power amplifier 126 where the error signal is converted into a D.C. voltage of one sign or the other, depending on the phase of the error signal. The push-pull power output tubes of the amplifier embodied in the unit 126 are supplied with plate voltage from a source 127 which is connected with the plates of the power tubes through the torque coils 128 and 129 of an electro-hydraulic valve 130. For zero error signal, the current flowing through the coils 128 and 129 is equal and opposite so that the valve is in its central or neutral position. Overdeflection or underdeflection of the tracer provides an error signal which unbalances the current flowing through the coils 128 and 129 and causes movement of the valve to thereby deliver fluid under pressure to a hydraulic servo-motor 131 which drives the tracer head 22 up or down to reduce the error. The servomotor may also be operatively connected with the tool head 21 as, for example, by means of a splined drive shaft 132 (Fig. 1) so as to cause the tool head to follow the movement of the tracer head as the latter follows the pattern.

It will be noted that when tracing is initiated by depression of the push button 123, the normally open contacts of relay 2CR in Fig. 4 will be closed, and the normally closed contacts thereof will be open so as to connect the amplifier 126 with the tracer 125. Also, so long as the relay 1SWR is energized, the normally closed contacts of relay 1CR in Fig. 4 will be open so as to permit normal current flow through the torque coils 128 and 129. If, for any reason, the receiver should fail to receive its appropriate control signal over the carrier current system, the relay 1SWR will be deenergized, thereby dropping out relays 1CR and 2CR. When the latter relay is dropped out, the amplifier 126 will be disconnected from the tracer 125 and its input terminals will be short circuited by the normally closed contacts of relay 2CR. When relay 1CR is deenergized, the contacts of this relay in Fig. 4 will close, thereby shunting a resistance 134 across the coil 129 so as to reduce the current flow through this coil and unbalance the valve so as to drive the servomotor 131 in such a direction as to raise the tracer head to the point where the cutter is completely removed from the work. This condition may be brought about by loss of vacuum from any one of the vacuum chucks 13–17, inclusive, or by failure of the transmitter or the receiver to operate in the intended manner. There is thereby provided a fail safe system which insures that the equipment must be operating properly in order to permit a tracing operation of the machine tool to continue.

The operation of the system is as follows:

Let it be assumed, for purposes of illustration, that the relay 701CR is associated with the receiver 66 on carriage 19, and that the relay 702CR is associated with the receiver 67 on carriage 20. In preparing the machine for operation, the switches 50–59 (Fig. 2) are each turned to the position shown in Fig. 2 so as to turn off the vacuum on the chucks and energize the relays 701CR and 702CR so as to permit the operators on carriages 19 and 20 to control the slides thereon in a normal manner for set-up purposes. Thereafter, the work, which may consist of one or more pieces to be machined is positioned on chucks 13–17, inclusive. The switches 50–59 are then all turned to their opposite positions to energize the solenoids 40–44 and thereby turn on the vacuum to the chucks. If the work is suitably positioned on the chucks so as to be firmly held in place thereon by the vacuum applied to the chucks, the vacuum switches 30–39 will all be closed, thereby extinguishing the lamps 701LT and 702LT and energizing relays 701CR and 702CR. The transmitter 65 will now be rendered operative to transmit signals to the receivers 66 and 67 and tracing may be initiated by the depression of the pushbutton switches 123 (Fig. 3) which are associated with each carriage. If, at any time the work should become disengaged from any of the chucks due to failure of the vacuum pump 45, a break in the vacuum lines 27 or 28, or vibration of the work by the cutter, the two vacuum switches associated with the chuck affected will open, thereby breaking the circuit to relays 701CR and 702CR (Fig. 2). This will cause the lamps 701LT and 702LT to light and will cut off the signals produced by the transmitter 65 due to the opening of contacts 701CR and 702CR in Fig. 5. The relays 1SWR (Fig. 3) will thereby become deenergized and so deenergize the relays 1CR and 2CR so as to disconnect the amplifiers 126 (Fig. 4) from the tracers 125 and unbalance the electro-hydraulic valves so as to lift the cutters on carriages 19 and 20 from the work. If, for any reason, the carrier current system should become inoperative due to a burned out tube or other circuit failure, the same result will be effected.

In the event that it is desired to operate the carriages independently of one another and also to operate one of them independently of the vacuum system, this may be accomplished through appropriate setting of the switches 50–59 inclusive. For example, if it is desired to skim chuck 13 with carriage 19 while operating on work held down by chucks 14, 15, 16, and 17 with carriage 20, the vacuum on chuck 13 may be turned off by manipulating switches 50 and 51 to the positions shown in Fig. 2. By likewise turning off switches 52, 54, 56, and 58 (i.e., moving these switches to the positions shown in Fig. 2), carriage 19 may be operated independently of carriage 20 and chucks 14, 15, 16, and 17. With the switches 53, 55, 57, and 59 turned to their "on" positions (i.e., to the opposite position from that shown in Fig. 2), carriage 20 will be left under the control of the vacuum switches 33, 35, 37, and 39 for chucks 14, 15, 16, and 17. Carriage 19 will, however, be independent of the vacuum on these chucks and skimming of chuck 13 may be carried out independently of operation on the work by carriage 20.

It will be noted that with the present arrangement wherein one set of contacts of switches 50–59 serve to shunt the vacuum switches 30–39 associated therewith, while the second set of contacts of switches 50–59 serve to turn on the vacuum, the possibility of turning on the vacuum to any of the chucks with a shorted vacuum indicator is eliminated. Also, the maintaining of the carrier current signal even during such times as the vacuum is not used insures that the failure of any part or component of the safety system cannot go unnoticed since any failure will act in the same way as would a lost vacuum.

While the invention has been described in connection with one possible form or embodiment thereof, it is to be understood that the present disclosure is illustrative rather than restrictive and that changes and modifications may be resorted to without departing from the spirit of the invention or the scope of the claims which follow.

We claim:

1. A remote control signaling system for a machine tool comprising a work support, normally effective means for holding the work in place on the work support, means for signifying the effective or ineffective condition of said holding means, a carriage mounted for movement relative to said work support, power operated means on said carriage, a tool on said carriage, means for moving the tool relative to the work, a plurality of power lines extending along the work support in the direction of travel of said carriage, means on said carriage for collecting current from said power lines and supplying it to said power operated means on the carriage, and a carrier current system including a transmitter connected to said power lines to impress control signals thereon and a receiver on said carriage connected to said power lines to receive said signals for controlling said moving means in accordance with the conditions of said work holding means.

2. A remote control signaling system for a machine tool comprising a work support, a plurality of normally effective means each adapted to releasably hold a work piece in place on the work support, means associated with each holding means for signifying the effective or ineffective condition thereof, a plurality of tools for operating on said work piece, carriage means for supporting said tools for translation along said work support, power operated means on said carriage means, means for moving each of said tools relative to the work piece, a plurality of power lines extending along the work support in the direction of travel of said carriage means, trolleys on said carriage means for collecting current from said power lines and supplying it to said power operated means, and a carrier current system for controlling the movement of said tools by said moving means, said system including means controlled by said signifying means for impressing on said power lines a separate carrier current signal for each of said tools, and means associated with each of said tools for receiving said signals and for controlling the moving means associated therewith in accordance with the condition of said work holding means.

3. The remote control signaling system of claim 2 wherein a pair of said signals are alternately applied to said power lines at a rate corresponding to the frequency of the supply current delivered by said power lines to the power operated means.

4. The remote control signaling system of claim 2 including selectively operable means for determining which of said signifying means shall be effective to control the transmission of the individual carrier current signals in accordance with the condition of the several work holding means.

5. A remote control signaling system for a machine tool comprising a work support, a plurality of vacuum chucks on said work support for holding the work to be machined, a normally open vacuum switch associated with each chuck for signifying the effective or ineffective condition thereof, a carriage mounted for movement relative to said work support, power operated means on said carriage, a tool on said carriage, means on the carriage for moving the tool relative to the work, a plurality of power lines extending along the work support in the direction of travel of said carriage, means on said carriage for collecting current from said power lines and supplying it to said power operated means on the carriage, and a carrier current system including a transmitter connected to said power lines to impress control signals thereon and a receiver on said carriage connected to said power lines to receive said signals for controlling said moving means in accordance with the condition of said vacuum chucks as signified by said vacuum switches.

6. The remote control signaling system of claim 5 including a relay for controlling the transmission of a signal by said transmitter, a source of energizing current for said relay, and means for connecting all of said vacuum switches and said relay in series with said source.

7. The remote control signaling system of claim 6 including a source of vacuum for said chucks, a valve for connecting each chuck to said source of vacuum, a solenoid for operating each of said valves, a plurality of double pole, double throw switches, means for connecting one pair of poles of each switch in parallel with one of said vacuum switches, and means for connecting the other pair of poles of each switch in series with one of said solenoids across said source of energizing current.

8. A remote control signaling system for a machine tool comprising a work support, normally effective means for holding the work in place on the work support, means for signifying the effective or ineffective condition of said holding means, a carriage mounted for movement relative to said work support, power operated means on said carriage, a tool on said carriage, means for moving the tool relative to the work including a tracer mechanism for traversing said tool toward and from the work, a plurality of power lines extending along the work support in the direction of travel of said carriage, means on said carriage for collecting current from said power lines and supplying it to said power operated means on the carriage, a carrier current system including a transmitter connected to said power lines to impress control signals thereon and a receiver on said carriage connected to said power lines to receive said signals for controlling said moving means in accordance with the conditions of said work holding means, and means controlled by said receiver for causing said tracer mechanism to withdraw the tool from the work upon release of the work by said holding means.

9. A remote control signaling system for a machine tool comprising a work support, normally effective means for holding the work in place on the work support, means for signifying the effective or ineffective condition of said holding means, a carriage mounted for movement relative to said work support, power operated means on said carriage, a tool on said carriage, means for moving the tool relative to the work, a plurality of power lines extending along the work support in the direction of travel of said carriage, means on said carriage for collecting current from said power lines and supplying it to said power operated means on the carriage, and a carrier current system including a transmitter connected to said power lines to impress control signals thereon and a receiver on said carriage connected to said power lines to receive said signals for controlling said moving means in accordance with the condition of said work holding means, said transmitter operated under the control of said signifying means to impress on said power lines a carrier current signal whenever said holding means is effective to hold the work in place on the work support and said receiver effective to control said moving means in accordance with the presence or absence of a signal on said power lines.

10. A remote control signaling system for a machine tool comprising a work support, means for holding the work in place on the work support, a carriage mounted for movement relative to said work support, power operated means on said carriage, a tool on said carriage, means for moving the tool relative to the work, a plurality of power lines extending along the work support in the direction of travel of said carriage, means on said carriage for collecting current from said power lines and supplying it to said power operated means on the carriage, and a carrier current system including a transmitter connected to said power lines to impress control signals thereon and a receiver on said carriage connected to said power lines to receive said signals for controlling said moving means.

References Cited in the file of this patent
UNITED STATES PATENTS

| | | |
|---|---|---|
| 1,025,371 | Coleman | May 7, 1912 |
| 2,160,476 | Kampmeier | May 30, 1939 |
| 2,345,494 | Onsrud | Mar. 28, 1944 |
| 2,730,707 | Habeerle et al. | Jan. 10, 1956 |
| 2,751,823 | Freter | June 26, 1956 |